July 18, 1972 D. F. HARDY 3,677,801
METHOD OF COATING IRREGULAR OBJECTS
Filed July 28, 1970 6 Sheets-Sheet 1

INVENTOR.
DONALD HARDY

July 18, 1972 D. F. HARDY 3,677,801
METHOD OF COATING IRREGULAR OBJECTS
Filed July 28, 1970 6 Sheets-Sheet 2
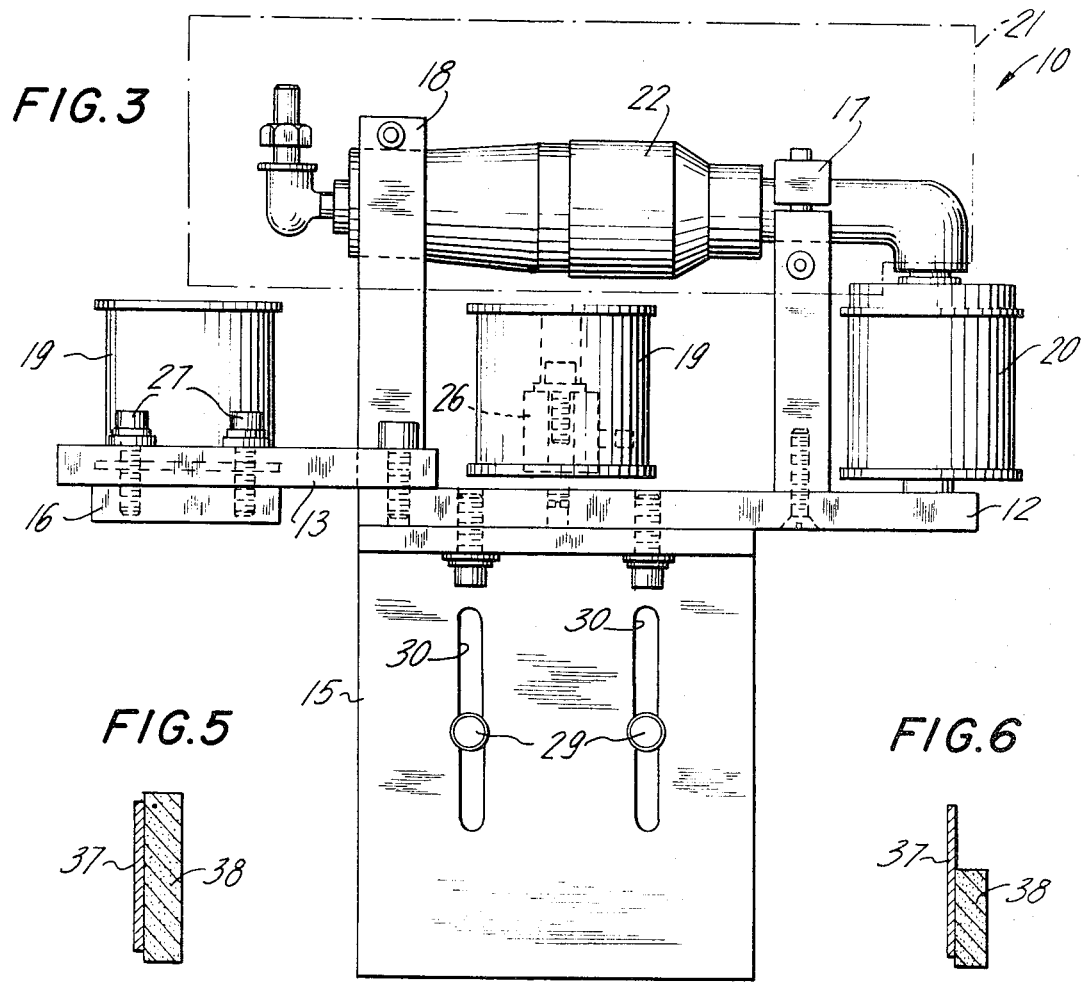
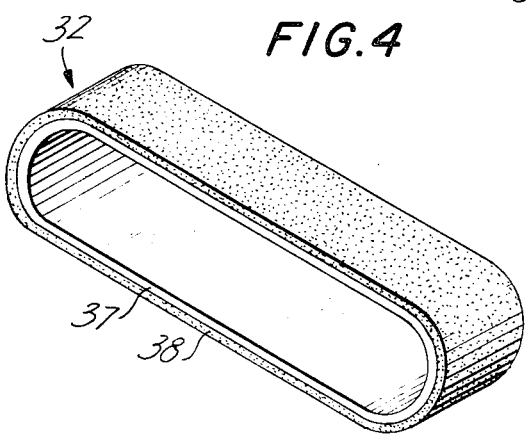
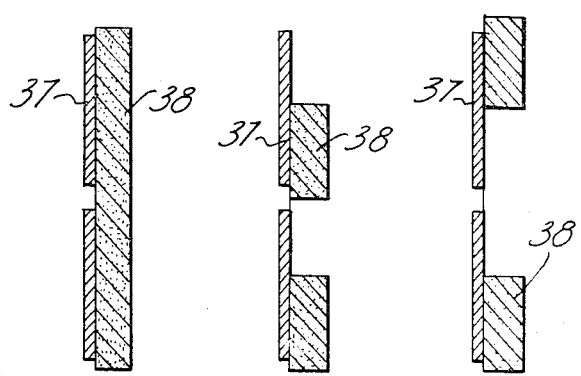
INVENTOR
DONALD HARDY

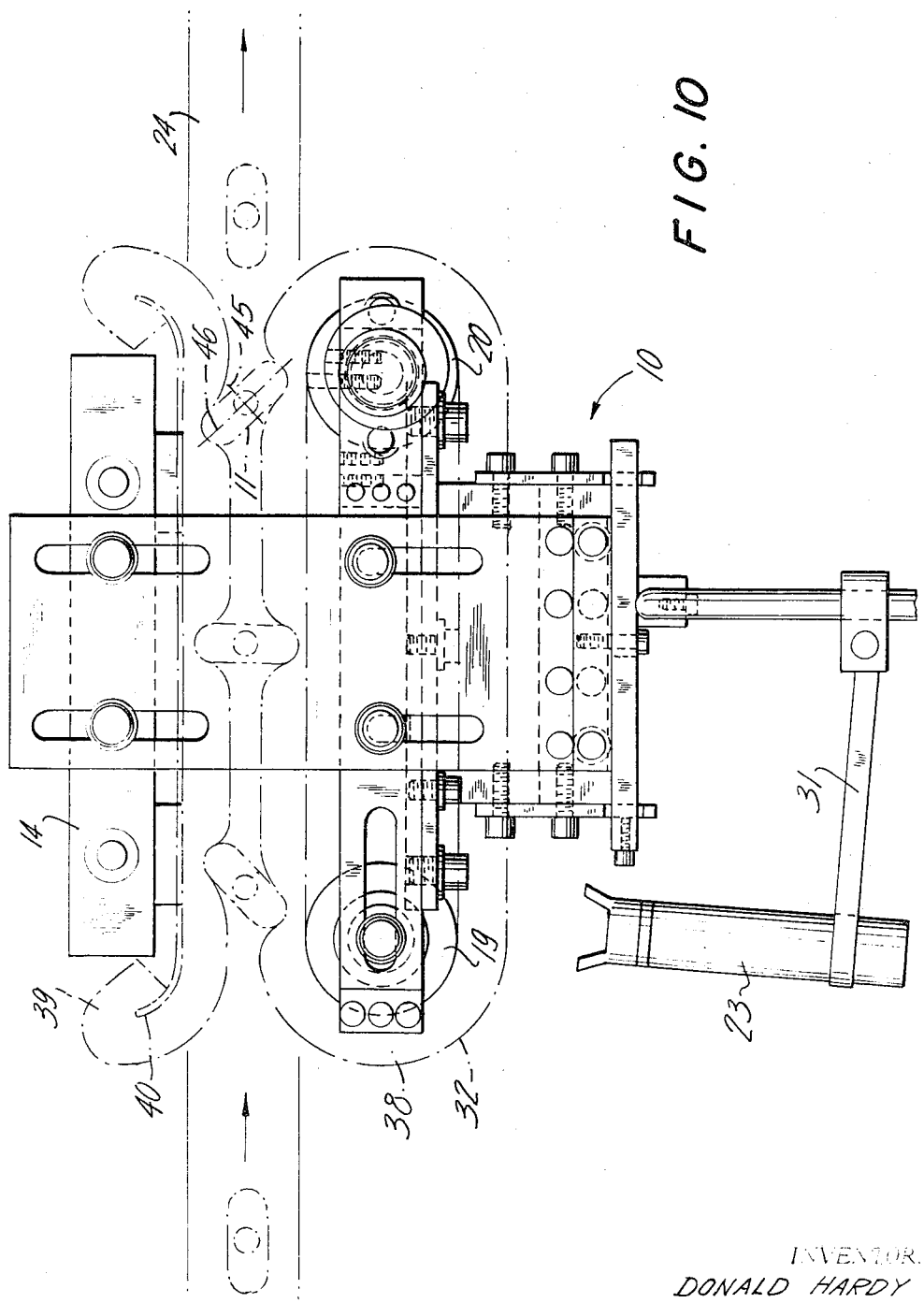

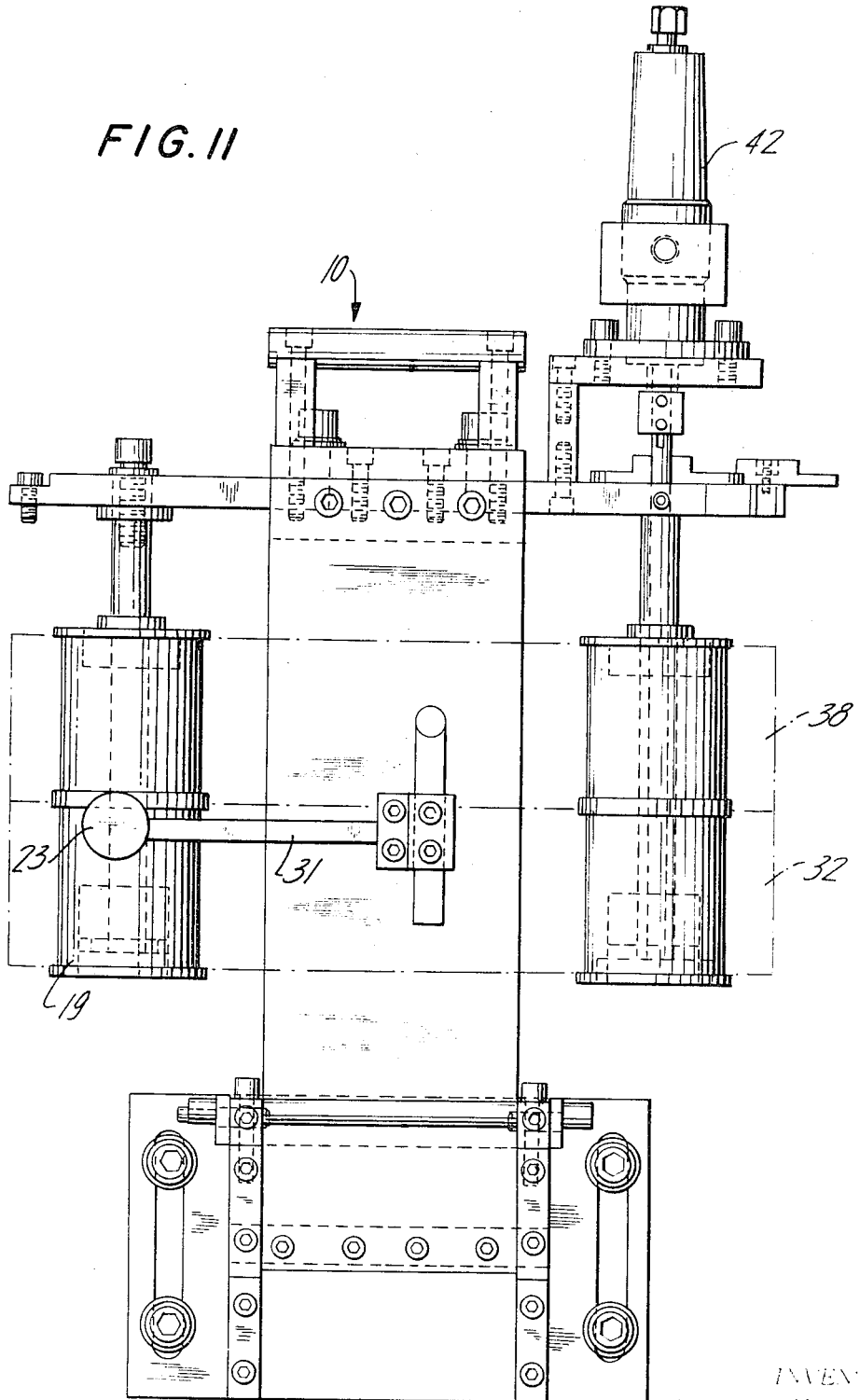

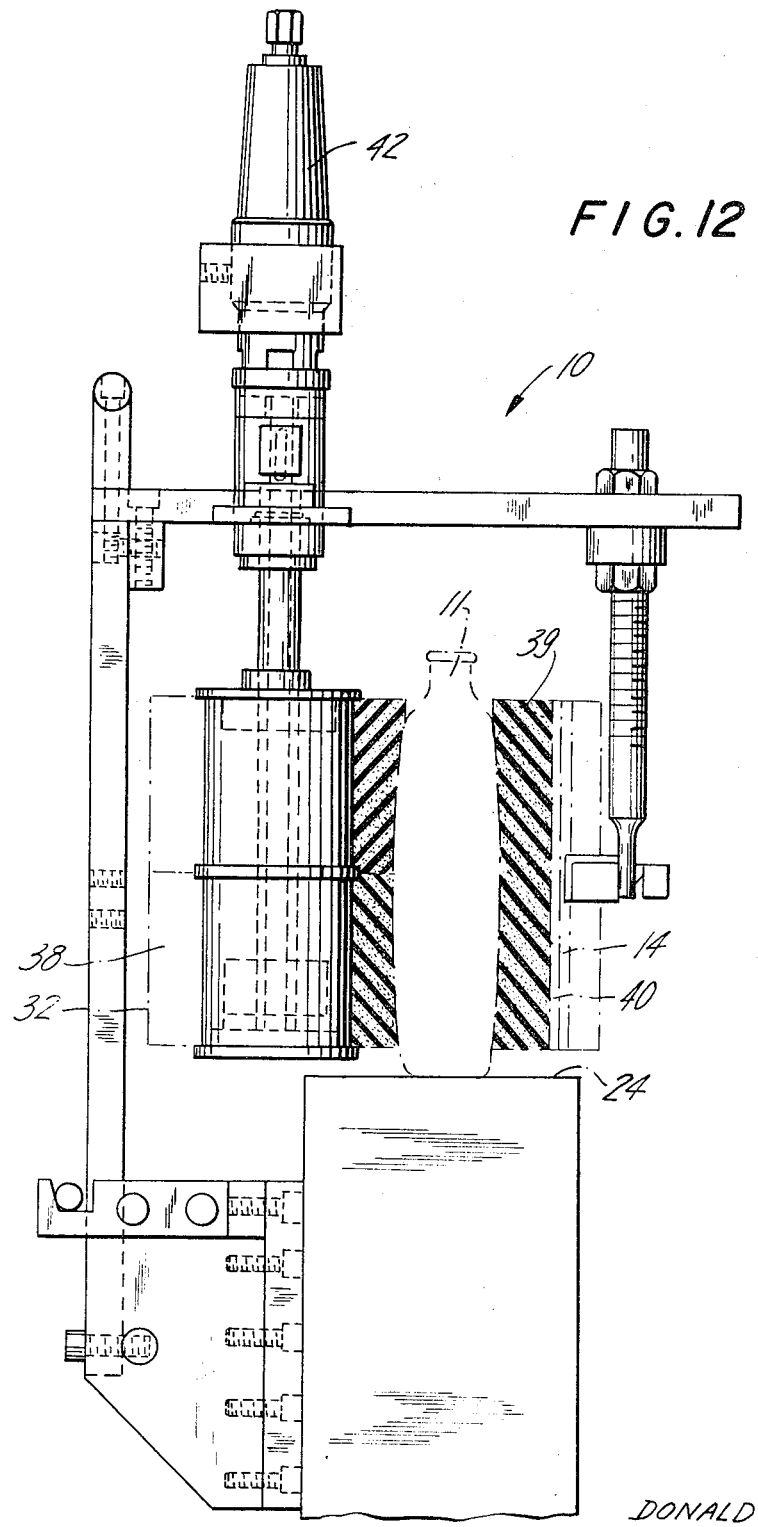

United States Patent Office 3,677,801
Patented July 18, 1972

3,677,801
METHOD OF COATING IRREGULAR OBJECTS
Donald F. Hardy, Horseheads, N.Y., assignor to Dart Industries, Inc., Los Angeles, Calif.
Continuation-in-part of application Ser. No. 820,529, Apr. 30, 1969. This application July 28, 1970, Ser. No. 62,217
Int. Cl. B44d 1/20
U.S. Cl. 117—94
3 Claims

ABSTRACT OF THE DISCLOSURE

A process and apparatus for coating an article having an irregular cross section. The apparatus comprises at least one belt having a polyurethane foam layer having a coating surface and a second foam layer having a second coating surface said surfaces facing each other and being spaced at a distance sufficient to permit both surfaces to coat the article, the combined thickness of said foam layers being thick enough to deform and cause said surfaces to conform to at least a portion of the surface of the article. In the process the article is conveyed to the coating surfaces of the apparatus. The belt then engages the surface of the article and transports it through the apparatus. The foam surface of the belt is supplied with coating material and the belt transfers the coating material to the article being coated.

---

This case is a continuation-in-part of my copending application Ser. No. 820,529 filed Apr. 30, 1969.

BACKGROUND OF THE INVENTION

(1) Field of invention

This invention concerns a novel process and machine for coating articles having various cross sections and relates more particularly to a process and machine for coating the outside peripheral surface of glass bottles.

(2) Description of the prior art

Coating of articles is done for a variety of reasons such as decoration, protection from corrosion, or to preserve article strength. Glass bottles and other articles made of breakable materials may have spots or places in their shapes which could be weakened by external abuse. It was known in the prior art that spray coating these articles helped to preserve their strength. Spray coating had many disadvantages. The articles, such as glass bottles were not always completely coated by the spray and the spray would often hit undesirable areas. When the spray method of coating articles was used, there was limited control over where the coating would be applied on the articles to be coated and it was difficult to place a heavier coating where the greatest protection was desired.

Other industries utilizing coating for decoration and protection recognized that spray coating had serious disadvantages and coating mechanisms were devised in an attempt to avoid the disadvantages of spray coating. The mechanisms devised had many undesirable characteristics. The machines could not be easily and quickly adapted to accept articles having different shapes and sizes. The machine generally could not be mounted on a standard conveyor system. Often the coated surfaces were contacted by parts of the machine after the coating was applied. Almost invariably the machines had complicated and expensive structures such as: overhead belts with expensive supporting frames, complicated guide tracts, spindles and spindle carrying mechanisms, complicated conveyor systems, and gravity feed mechanisms with intricate control systems. Although some machines were adjustable to handle articles having different shapes and sizes often the adjustments took a great deal of time and heavy machine parts had to be lifted or lowered. In addition to the above disadvantages none of the devices were able to apply coatings on a single predetermined area of the article being coated.

BRIEF DESCRIPTION OF THE INVENTION

This invention relates to a process and machine for coating the peripheral surface of an article such as a glass bottle. The process comprises driving the coating surface of an applicator belt against a portion of the peripheral surface of the article. The moving applicator belt may rotate or transport the article against other coating surfaces thus coating a predetermined portion of the peripheral surface of the article. The surface of the belt may be any suitable material for paint coaters, but is preferably polyurethane foam. The flexible backing of the belt may be any strong flexible material such as burlap, nylon, rubber or flexible plastic.

An object of this invention is to provide a process and machine for completely coating a predetermined portion of the peripheral surface of an article having a substantially circular cross section.

Another object of this invention is to provide a process and machine for coating a predetermined area on the peripheral surface of an article having a substantially circular cross section with the upper and lower edges of the coated area being well defined.

Another object of this invention is to provide a machine for coating an article which may have any of a variety of cross sections.

Another object of this invention is to provide a process and machine for coating the peripheral surface of an article which may have a variety of cross sections which places the coating where it is needed while keeping the coating material away from areas on the article where it is not desired.

Another object of this invention is to provide a relatively simple machine for coating the peripheral surface of an article which may have a variety of cross sections.

Another object of this invention is to provide a machine for coating the peripheral surface of an article which may have a variety of cross sections which can be rapidly adjusted to receive articles having different shapes and sizes without raising or lowering heavy machine parts.

Another object of this invention is to provide a machine which can be easily mounted on a standard conveyor system.

Another object of this invention is to provide a novel belt coating machine.

Another object of this invention is to provide a belt coating machine having a novel applicator belt comprising a flexible backing layer and a flexible polyurethane foam coating surface laminated to the flexible backing layer.

Other objects of this invention will become apparent throughout the following specification.

FIG. 1 is a top plan view of a belt coater.
FIG. 2 is a plan view of a belt coater as seen from the downstream end.
FIG. 3 is a side plan view of the belt coater assembly.
FIG. 4 is a perspective view showing a continuous applicator belt.
FIG. 5 is a cross sectional plan view of an applicator belt for the belt coater.
FIG. 6 is a cross sectional plan view of a second embodiment of an applicator belt for the belt coater.
FIG. 7 is a cross sectional plan view of a first combination of applicator belts on a double spool belt coater.

FIG. 8 is a cross sectional plan view of a second combination of applicator belts on a double spool belt coater.

FIG. 9 is a cross sectional plan view of a third combination of applicator belts on a double spool belt coater.

FIG. 10 is a top plan view of an alternative embodiment of a belt coater for articles having an irregular cross section.

FIG. 11 is a front view of the embodiment shown in FIG. 10.

FIG. 12 is a view of the downstream end of the embodiment shown in FIG. 11.

PREFERRED EMBODIMENT

In accordance with this invention an article such as a glass bottle having a substantially circular cross section is coated by driving an applicator belt which has been sprayed with coating material against the peripheral surface of the article. The article is directed to the surface of the applicator belt by means of a conveyor. A portion of the peripheral surface of the article is held against the surface of the applicator belt by means of a stationary backplate. The moving applicator belt then rolls the article along the backplate while coating a predetermined portion of its peripheral surface. The coating which is applied may be for strength, decoration or protection from corrosion.

Figure 1:
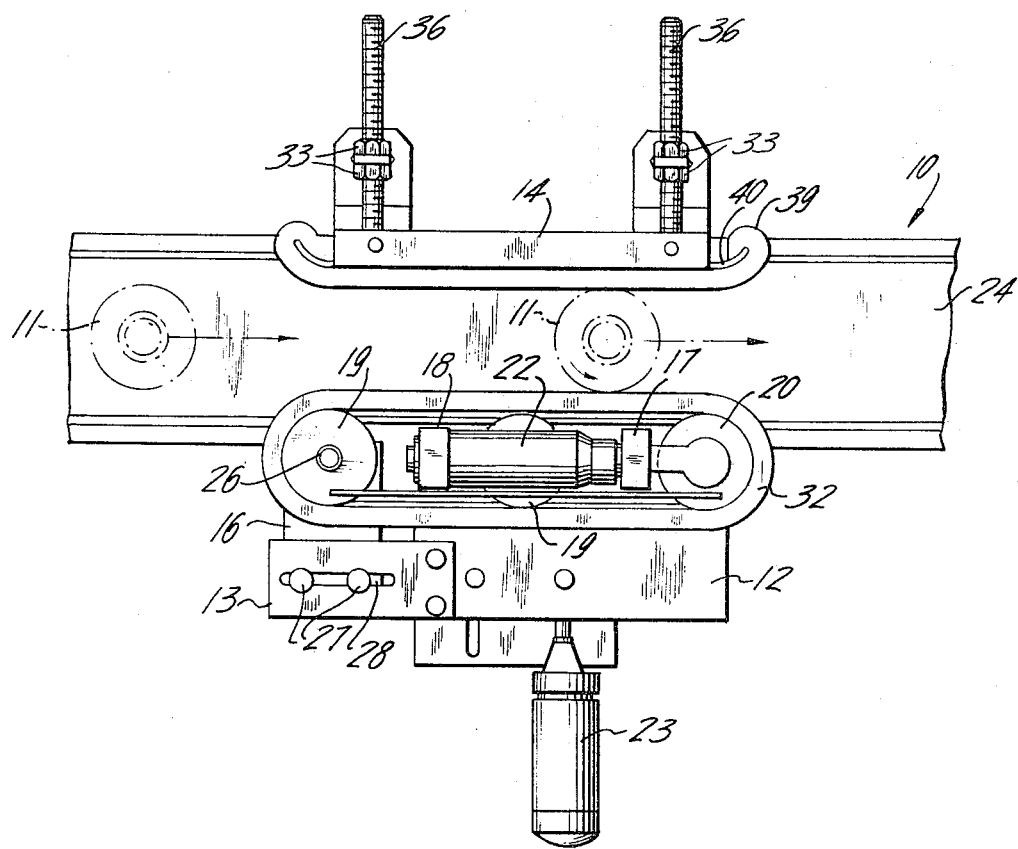
Figure 2:
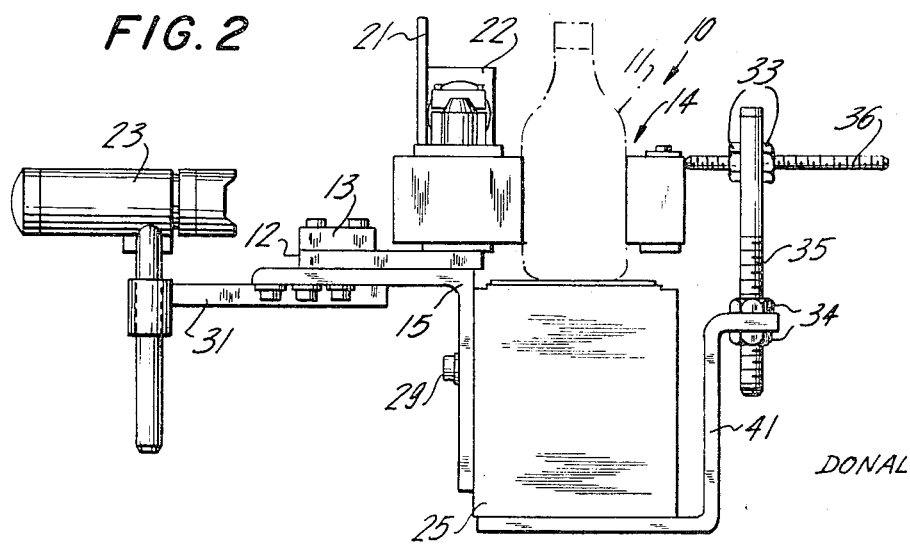

As seen in FIGS. 1 and 2 glass bottle 11 is carried by conveyor 24 to a position between applicator belt 32 and backplate 14. As seen in FIG. 4 applicator belt 32 has a foam coating surface 38, which may be a material such as polyurethane foam, laminated to a flexible backing layer 37 which can be made of any suitable material such as rubber, plastic, or fabric such as burlap. Applicator belt 32 is driven about spools 19 and drive spool 20. Drive spool 20 is driven by means of right angle drive air motor 22 which is mounted to base plate 12 by means of motor clamp 17 and motor support 18. The applicator belt 32 may be tightened or loosened by sliding adjustable spool plate 16 in slotted base 13. Adjustable spool plate 16 is mounted in spool plate slot 28 by means of spool plate bolts 27 which are tightened to prevent movement in spool plate slot 28 after applicator belt 32 has been tightened. Slotted base 13 is bolted to base plate 12. As best seen in FIG. 3, spools 19 and drive spool 20 are mounted to base plate 12 on ball bearings 26 in each spool.

Base plate 12 is bolted to mount 15 which is in turn bolted to conveyor frame 25 by means of mount bolts 29. Applicator belt 32 can be readily raised and lowered by raising and lowering mount 15. Mount 15 is provided with mount slots 30 which permit mount 15 to be secured by mount bolts 29 in varying elevational positions. Applicator belt 32 is supplied with coating material from coating spray head 23 which is secured to mount 15 by means of spray head support assembly 31. Stationary sponge backplate assembly 14 has a rigid plate 40 covered by a polyurethane foam backplate surface 39. Foam backplate surface 39 is mounted in a position substantially parallel to and facing a maximum of foam coating surface 38 of applicator belt 32 and is mounted away from foam coating surface 38 by a distance substantially equal to the diameter of the circular cross section of the portion of the article such as a glass bottle, to be coated. A maximum of foam coating surface is the foam coating surface between the spools. Stationary sponge assembly 14 may be moved closer to or farther away from foam coating surface 38 by means of horizontal backplate supports 36 each of which is mounted in a vertical backplate support 35. Horizontal backplate support plate 36 is secured to vertical backplate support 35 by means of horizontal adjustment nuts 33. The stationary sponge assembly 14 can be raised or lowered by raising and lowering vertical backplate supports 35. Vertical backplate support 35 is secured to frame segment 41 by means of vertical adjustment nuts 34. Frame segment 41 is bolted to conveyor frame 25. In order to prevent coating spray from reaching undesirable locations spray deflector 21 is mounted between coating spray head 23 and glass bottle 11.

Roller coater 10 may be provided with double spools and double applicator belts for greater adaptability to the surface area of the article to be coated. FIGS. 5 and 6 show that foam coating surface 38 may be reduced to coat a smaller area on the glass bottle. FIGS. 7, 8, and 9 show examples of the flexibility obtained when double spools and double belts are used. Foam coating surface 38 need not have a flat surface but may have a curved surface to correspond with the surface of the article to be coated.

In operation glass bottle 11 is carried by conveyor 24 between applicator belt 32 and foam backplate surface 39. Foam coating surface 38 of applicator belt 32 engages the surface of glass bottle 11 and rolls or rotates the bottle along the backplate surface. As the bottle rotates foam coating surface 38 coats the surface of bottle 11. Coating spray head 23 provides applicator belt 32 with a constant supply of coating material.

FIG. 10 shows an alternative embodiment of the belt coater shown in FIG. 1. The operation of the belt coater shown in FIG. 10 is substantially the same as the belt coater shown in FIG. 1 except a direct drive air motor 42 is used, the method of adjustment is modified and the belt coater in FIG. 10 has a backplate which has a thicker foam layer which may also form coating surface 39 and has an applicator belt 32 which also has a thicker foam layer which may also form surface 38. The thicker foam permits an article having an irregular cross section to rotate through the coater since the thicker foam adjusts to accept the irregular shapes. "Irregular cross sections" as used above means any non-circular irregular plane figure and includes a plane figure where all points on the circumference of the figure are not equidistant from a single point located in the same plane. An irregular plane figure as defined includes equilateral and irregular polygons; non-circular ellipses; regular and irregular non-circular curvilinear figures; and figures defined by combination of curvilinear and linear segments. FIG. 10 shows a belt coater having thicker foam surfaces being used to coat bottles having a substantially elliptical shape. The distance between surface 38 and surface 39 must permit the article to be contacted by both surfaces. The foam must be thick enough to permit the article to rotate between the surfaces.

Figure 13:
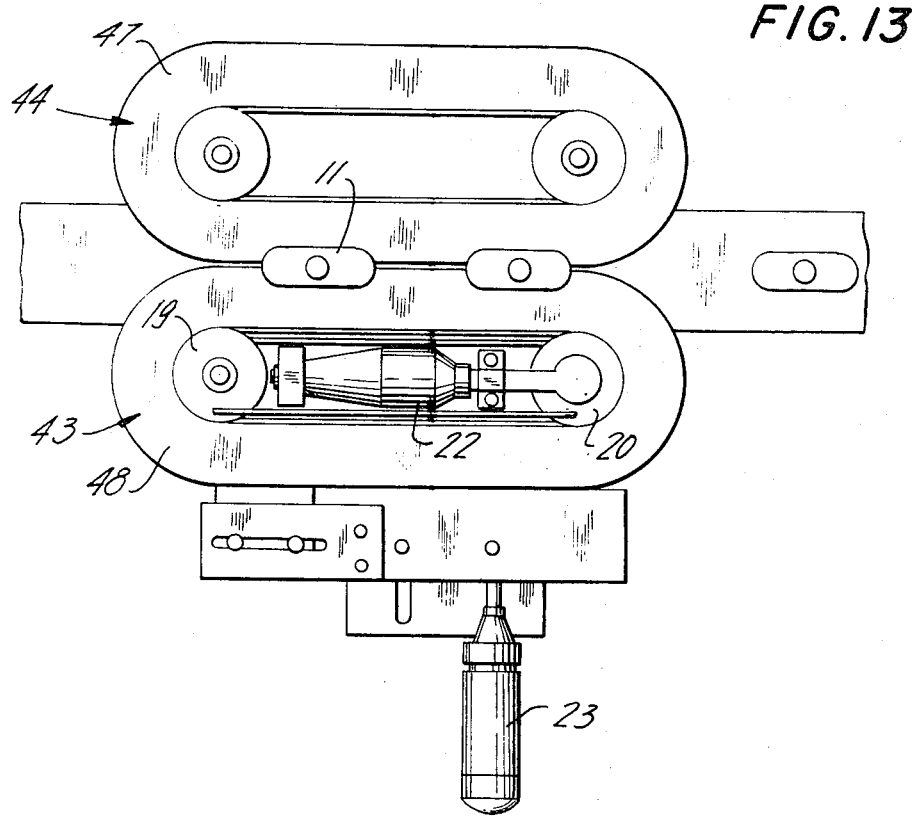
FIG. 13 is a top plan view of a second alternative embodiment of a belt coater for articles having an irregular cross section.
Figure 14:
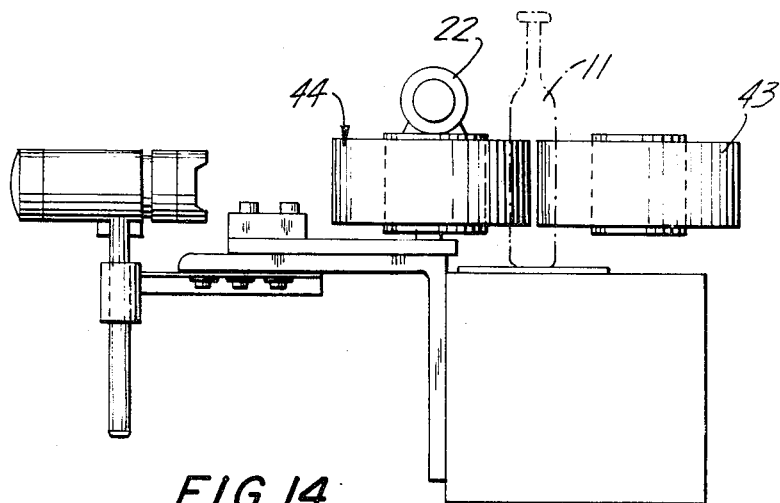
FIG. 14 is a downstream end view of the embodiment shown in FIG. 13.

FIG. 13 shows a second alternative embodiment of the belt coater wherein another belt has been substituted for a stationary backplate. This embodiment can also be used to coat articles having an irregular cross section. The coater is similar to the first coater described except no stationary backplate is used and at least two belts 43 and 44 are used. Each belt is mounted on spools 19 and 20 in the same manner as the single belt is mounted in the previously described embodiment so that the coating surfaces 49 and 50 of each of said belts faces a portion of the coating surface of the other belt and so that the conveyor will carry the article to be coated between the belts. Each belt has a foam layer 47 and 48 and the combined thickness of the foam layers is thick enough to permit the article such as a bottle 11 to sink into the foam as shown in FIGS. 13 and 14. The distance between the belts should be the smallest distance which will permit both of the belts to rotate and which will permit the article 11 to be carried between the belts 43 and 44. As the article is carried between the belts the foam layer conforms to the surface of the article and the surface is coated by the belts 43 and 44. It is preferred that the combined thickness of the foam layers be thick enough to deform and cause the coating surface to conform to at least a portion of the peripheral surface of the article.

The foam layers 47 and 48 may be made thick enough and cause the coating surfaces 49 and 50 to conform to and cover substantially all of the peripheral surface of the article. In operation the coater shown in FIG. 13 is otherwise similar to the coaters previously described; however, two air motors 19 can be provided to drive each of the belts 43 and 44 individually.

What is claimed is:

1. A process for coating an article having an irregular cross section said process comprising:

driving at least two applicator belts said belts having foam layers thick enough to deform and cause the surface of said foam to conform to and cover substantially all of the peripheral surface of said article, spraying the surface of said applicator belts with coating material, directing said article to the surface of said applicator belts so that said article is conveyed by said belts through a space between the surfaces of said belts and so that the surface of said article sinks into the surface of said belt causing the surfaces of said article to be coated.

2. The process of claim 1 wherein said article is a glass bottle.

3. The process of claim 2 wherein said irregular cross section is an ellipse.

References Cited

UNITED STATES PATENTS

| 249,029 | 11/1881 | Du Brul | 118—233 |
|---|---|---|---|
| 1,786,437 | 12/1930 | Lehman | 118—233 |
| 2,868,162 | 1/1959 | Knain | 117—94 X |
| 2,930,057 | 3/1960 | Evans | 15—99 |

EDWARD G. WHITBY, Primary Examiner

U.S. Cl. X.R.

117—111 R; 118—233